United States Patent

[11] 3,602,478

| [72] | Inventor | Theordore F. Cairns<br>Coraopolis, Pa. |
|---|---|---|
| [21] | Appl. No. | 826,924 |
| [22] | Filed | May 22, 1969 |
| [45] | Patented | Aug. 31, 1971 |
| [73] | Assignees | Oscar L. Minear;<br>Gary M. Stary; Fred L. Potts; Earl<br>Schaffer; Phillip M. Kerr; William<br>Zuccaro; Robert Pendel, , Part interest to each |

[54] VALVE CONTROL UNIT
4 Claims, 6 Drawing Figs.

[52] U.S. Cl. ................................................. 251/58,
251/285
[51] Int. Cl. ................................................. F16k 31/165
[50] Field of Search ........................................ 251/58, 60,
42, 285; 74/89, 89.15; 92/33

[56] References Cited
UNITED STATES PATENTS

| 330,549 | 11/1885 | Beard et al. .................... | 251/58 X |
| 862,867 | 8/1907 | Eggleston ..................... | 251/61.1 UX |
| 1,542,517 | 6/1925 | Partlow ........................ | 251/60 |
| 2,568,404 | 9/1951 | Nardone ....................... | 92/33 |
| 2,883,144 | 4/1959 | Kendig ......................... | 251/58 |

FOREIGN PATENTS

| 774,020 | 5/1957 | Great Britain ................ | 74/89.15 |

Primary Examiner—M. Cary Nelson
Assistant Examiner—R. B. Rothman
Attorney—Webb, Burden, Robinson and Webb ABSTRACT: A valve control unit comprising a housing containing a pneumatically operated diaphragm and a floating diaphragm head connected to a nonrotatable adapter having an opening containing helically spiraled grooves. A shaft, one end of which has a set of perimetrical threads which mate with the helically spiraled grooves of the adapter, is connected at its other end to the valve-actuating member. A downward movement of the diaphragm acting on the diaphragm head rotates the shaft and actuates the valve. The diaphragm head is spring biased to return to a starting position and adjustable stops are connected to the diaphragm head to limit the stroke thereof and, therefore, control the amount of actuation to the valve.

INVENTOR.
Theodore F. Cairns
BY
Webb Burden Robinson & Webb
HIS ATTORNEYS

INVENTOR.
Theodore F. Cairns
BY
Webb Burden Robinson & Webb
HIS ATTORNEYS

INVENTOR.
Theodore F. Cairns
BY
Webb Burden Robinson & Webb
HIS ATTORNEYS

VALVE CONTROL UNIT

This invention relates to a valve control unit and more particularly to a control unit where the downward movement of an adapter rotates a shaft to open and close a valve. Large industrial valves are commonplace within today's industrial complexes. These valves of varying design and type are being used in an increasing number of applications where control of a liquid or other media is involved. Because of increased sophistication in processing lines, the precise control of these valves becomes a must. These valves whether they be ball, globe, butterfly, hydraulic or the like can function no better than the control unit which is actuating the valve. For this purpose, various gear arrangements or lever assemblies have been employed in the past to change the direction of rotating shafts and the like to eventually control the movable valve member. This has resulted in valve control units which are far more complicated in design, upkeep and replacement of parts than the valve which is being controlled.

My invention provides a valve control unit which is simple in construction and which has a minimum of moving parts. In my invention, there is unidirectional torque, thereby eliminating the complex gear or lever assemblies known heretofore which have been employed to ultimately transform the torque of a driven shaft into the valve for actuation of the movable valve member. My invention further provides a rapid means of adjustment to control the exact amount of actuation of the movable valve member so that changes in valve requirements can easily be made. By providing a single rotatable shaft, I have thereby eliminated the gears, cams, levers, and the like which have been used heretofore in accomplishing control of the valve. Because of the straight drive of the shaft to the valve, an improved throttling action is obtained over presently known valves.

My invention provides a valve control unit in which a nonrotatable adapter connected to an actuating means such as a diaphragm and diaphragm head and having a spirally grooved opening is movable on a mating perimetrical threaded end of a shaft, and the shaft connects at its other end to the actual moving member in the valve. A downward movement of the adapter rotates the shaft actuating the valve member. Stop means are provided to control the stroke of the adapter and the movement of the valve member and adjusting means are provided to give the proper stroke.

In the accompanying drawings, I have shown one preferred embodiment of my invention in which.

I have shown my valve control unit 10 connected to a butterfly valve 11. It will be recognized by those skilled in the art that my valve control unit 10 is adaptable to many kinds of valves including but not limited to gate valves, butterfly valves, ball valves, globe valves, hydraulic valves and the like.

Figure 3:
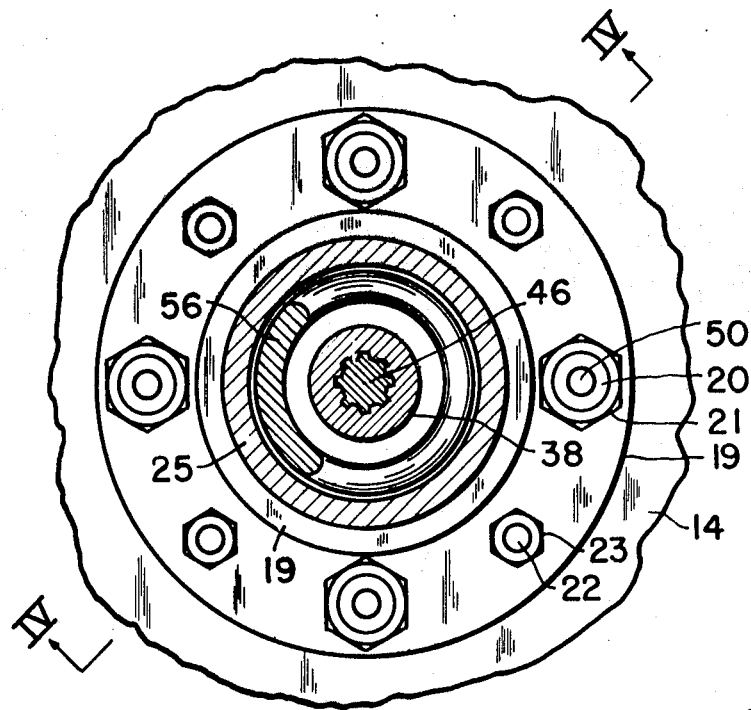
FIG. 3 is a section along section lines III—III of FIG. 2.
Figure 4:
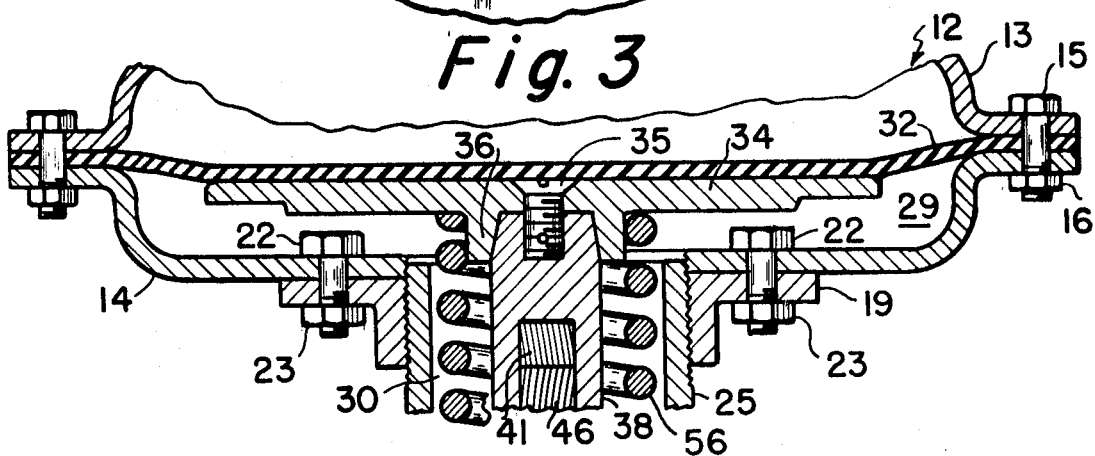
FIG. 4 is a section along section lines IV—IV of FIG. 3.

The valve control unit 10 is contained in housing 12. Housing 12 comprises a number of connected members. Annular upper plate 13 forms the top portion of housing 12. Upper plate 13 is connected to annular lower plate 14 which also forms a part of housing 12. The connection between plates 13 and 14 is by means of bolts 15 and 16 through aligned openings 17 and 18 positioned in the outwardly opposed flanges of upper plate 13 and lower plate 14, respectively. An annular flange 19 is connected to the bottom of plate 14 by means of four sleeve bolts 20 and nuts 21 and four regular bolts 22 and nuts 23, see FIGS. 3 and 4. The large central opening of annular flange 19 is aligned with a similarly dimensioned opening in the lower plate 14. The portion of flange 19 which defines the central opening is internally threaded. Cylinder 25 threaded externally at its ends is threadably mounted at one end to flange 19. Cylinder 25 and flange 19 are also part of housing 12. The other end of cylinder 25 is threadably mounted to mounting plate 26 which in turn is bolted to butterfly valve 11 by bolts 27. An internally threaded inlet 28 is centrally positioned in the top of upper plate 13. Hosing (not shown) is connected to the inlet 28 to carry a pneumatic pressure signal to actuate the control unit 10.

The upper and lower plates 13 and 14, respectively, define inner chamber 29 and cylindrical member 25 defines chamber 30 which communicates with chamber 29. In essence, chambers 29 and 30 represent a single T-shaped chamber defined by housing 12.

A diaphragm 32 is positioned in chamber 29 and is secured in place by being extended to fit between the outwardly opposed flanges of upper and lower plates 13 and 14, respectively. Therefore, bolts 15 also pass through holes in diaphragm 32 to secure the diaphragm in place. When the diaphragm is not being acted upon, it rests against stops 33 which are connected by any suitable means to the inner surface of upper plate 13. The diaphragm 32 is then operable in the completely sealed chamber 29. A floating diaphragm head 34 is positioned against the bottom surface of diaphragm 32. Diaphragm head 34 is spring biased as is explained in detail hereinafter. Diaphragm head screw 35 extends downwardly through diaphragm head 34 so the screw threads are bared within the chamber 29.

Figure 1:
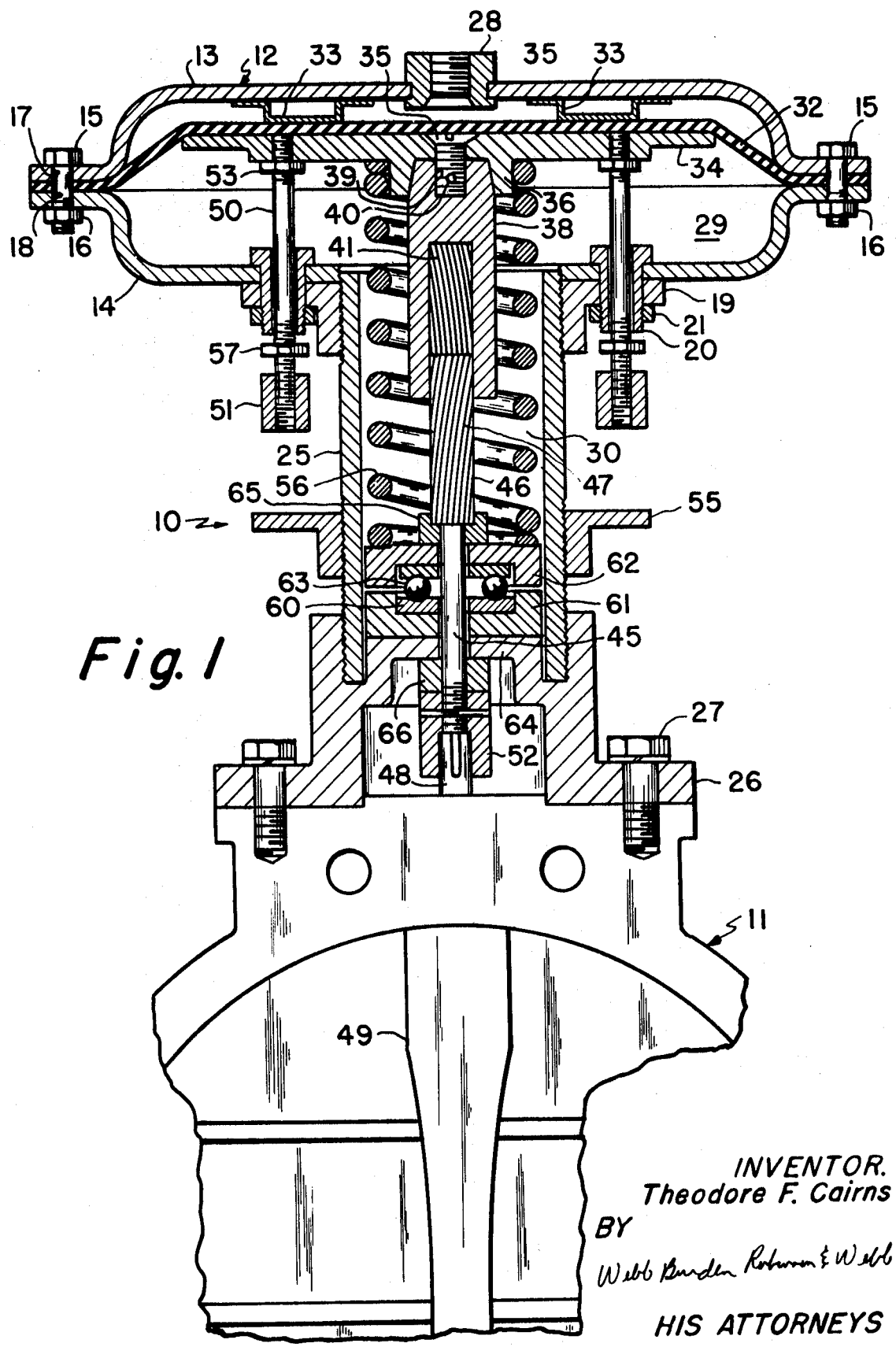
FIG. 1 is a full section of my valve control unit in the closed position.

Adapter 38 having an upper internally threaded recess 39 is threadably mounted on the bared threads of diaphragm head screw 35. A pin 40 is inserted through the adapter 38 and screw 35 to insure a rigid connection. Adapter 38 is slightly tapered at its upper end to cooperate with a mating taper formed by downwardly extending flanges 36 of diaphragm head 34. Adapter 38 also has a lower internal recess 41 which contains a set of helically spiraled grooves. The adapter 38 extends downwardly into chamber 30 when the diaphragm head is not being acted upon, see FIG. 1.

Figure 6:
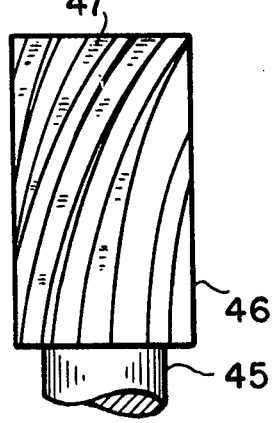
FIG. 6 is a front elevation of the top portion of the rotatable shaft.
Figure 5:
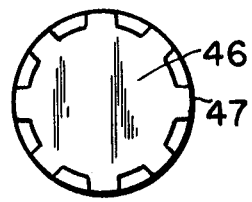
FIG. 5 is a plan view of the top portion of the rotating shaft.

A shaft 45 cooperates with the lower internal recess 41 of adapter 38. The upper portion 46 of shaft 45 has a set of helically spiraled perimetrical threads 47 which mate with the helically spiraled grooves of adapter 38. The cooperation between the perimetrical threads and mating grooves is similar to a spline assembly except the spline is spiraled so the threads move along the grooves rotating the shaft 45, see FIGS. 5 and 6. The other end of shaft 45 is connected along a common axis to valve shaft 48 of valve 11. The connection is by a standard threaded, keyed and pinned coupling 52. Valve shaft 48 in turn is rigidly connected (not shown) to the damper 49 of the valve 11.

It is essential that the adapter 38 only moves along its longitudinal axis with absolutely no turning or twisting motion. To insure this, four rods 50 are threadably connected to the floating diaphragm head 34 and secured thereto by jam nuts 53. These rods 50 are positioned and dimensioned to extend through chamber 29 and slidably through sleeves 22 of sleeve bolts 20 which connect the annular flange 19 to lower plate 14, see FIGS. 1–3. Therefore, movement of the diaphragm head 34 and all members attached thereto is limited by these rods 50 along a single plane. The rods 50 extend completely out of housing 12 and are threadably terminated. Adjusting stop nuts 51 are threadably mounted onto the outwardly extending ends of rods 50. Annular collar 55 is threadably mounted about the exterior of cylinder 25 to act as a stop for rods 50 and their stop nuts 51. In other words, the downward movement or stroke of diaphragm head 34 and connected adapter 38 is terminated when stop nuts 51 contact collar 55. Stop nuts 51 are adjustable on rods 50 and, therefore, can be varied to change the stroke of the adapter 38.

As indicated earlier, floating diaphragm head 34 is spring biased by helical spring 56 which is positioned within housing 12 and about adapter 38 and shaft 45. Helical spring 56 abuts diaphragm head 34 on one end and a thrust bearing assembly 60 positioned at the lower end of chamber 30. Therefore, this spring 56 forces diaphragm head 34 back to its starting position and forces diaphragm 32 against stops 33 when the pneumatic signal is removed. Adjustable nuts 57 are also threaded on rods 50 above adjusting stop nuts 51. The nuts 57 are adjustable to contact the bottom of sleeve bolts 20 to limit the return stroke of the diaphragm head 34 before the diaphragm contacts stops 33. This stop means on the return stroke is employed where it is desired to keep the damper 49 slightly open at all times, for example, to permit constant seepage through the valve.

Thrust bearing assembly 60 is of the standard type and can be varied as will be recognized by those skilled in the art. Its function here is to permit the turning of lower member 61 of assembly 60 without turning upper member 62 of assembly 60 and this, of course, is accomplished by the movement about ball bearings 63 positioned between lower and upper members 61 and 62, respectively. This adjustment permits adjusting the spring tension of spring 56 which rests on upper member 62 without putting any twist into the spring. The thrust bearing assembly 60 sits on supporting plate 64 which is a part of mounting plate 26 and which is positioned in the bottom of cylinder 25. Because shaft 45 rotates, a bronze recessed collar 65 is positioned on upper member 62, although a thrust bearing has also worked satisfactorily. The end of helically spiraled threaded portion 46 of shaft 45 rests in the recess and rotates therein. A similar unrecessed collar 66 is positioned below thrust bearing assembly 60 against lower member 61 and is firmly held there by the threaded, keyed and pinned coupling 52.

Figure 2:
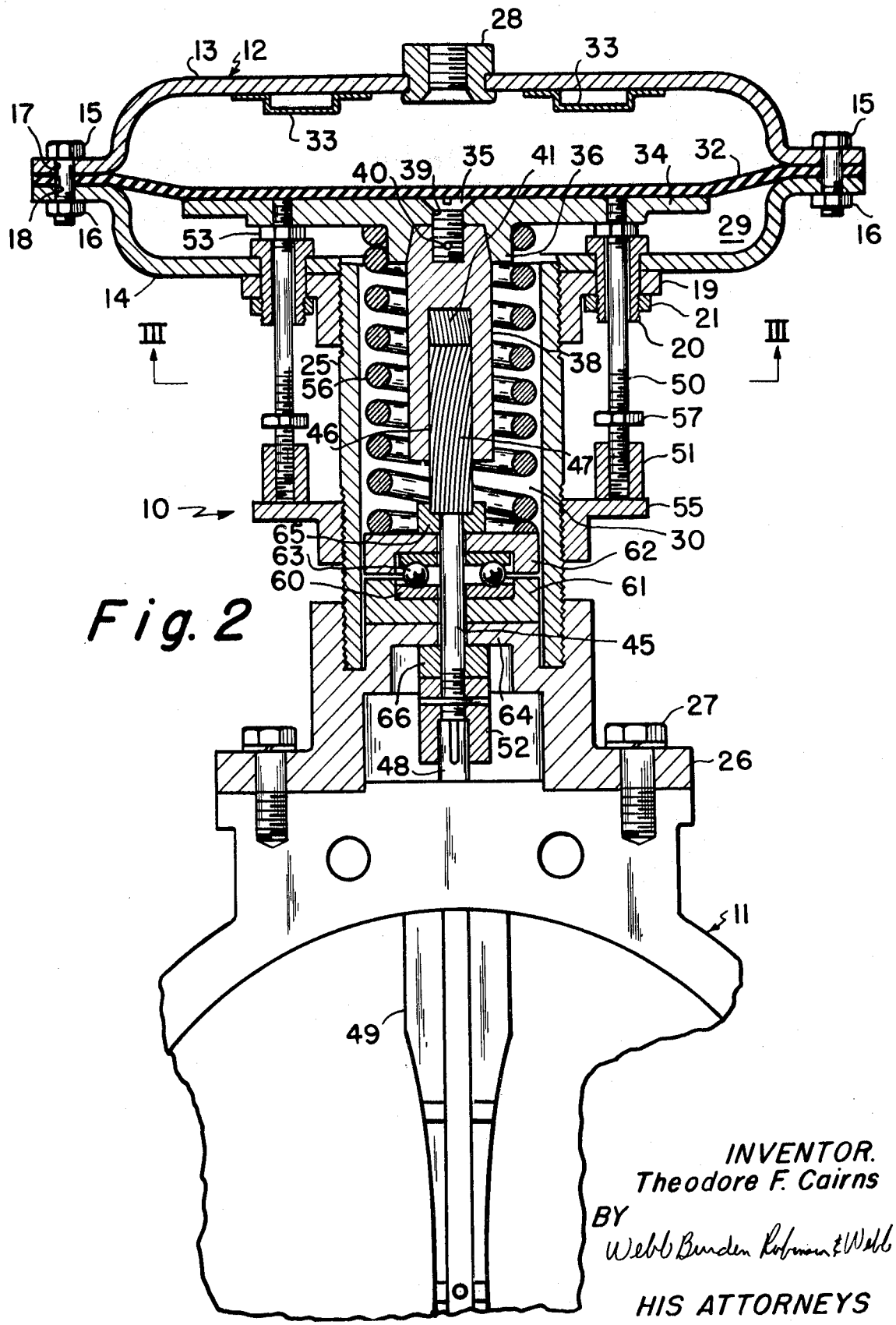
FIG. 2 is a full section of my valve control unit in the open position.

The operation of my valve control unit is as follows: When a pneumatic signal is sent through inlet 28, diaphragm 32 is forced downward on diaphragm head 34. This movement, referred to as the forward stroke, drives the diaphragm head 34, adapter 38 and all the other connected members downward from the starting position illustrated in FIG. 1. Adapter 38 which cannot rotate because of rods 50 moves downward on the helically spiraled portion 46 of shaft 45 causing the perimetrical threads to move up the mating grooves in internal recess 41 and causing shaft 45 to rotate. Rotating shaft 45 in turn rotates valve shaft 48 rigidly connected thereto and opens damper 49 of valve 11 as illustrated in FIG. 2. The forward stroke and, therefore, the amount of opening of damper 49 is limited by the contact of the adjustable stop nuts 51 acting on collar 55. After the pneumatic signal is removed, helical spring 56 returns the diaphragm head to abut the stops 33, thereby closing the damper 49. Adjusting nuts 57 can be positioned on rods 50 to limit the return stroke and keep the damper 49 partially open at all times. I have constructed a particular valve control unit whereby the damper is rotated 90° in a stroke of 1 3/4 inches. The stroke, of course, will vary with size, torque and other requirements of the valve and will generally coincide with the length and other requirements of the valve and will generally coincide with the length of the helically spiraled portion of the shaft. However, since my valve control unit is strategically positioned aligned with the valve shaft, there is a direct cushioning effect to prevent wear and tension in both the open and closed positions and, therefore, it will be a simple task to those skilled in the art to determine the necessary stroke.

Where extremely large valves are employed requiring considerable shaft torque to open and close the valve, a piston arrangement can replace the diaphragm. In this type of arrangement, the piston head merely carries the adapter and the piston can be returned to its original position by a return stroke arrangement well known in the art rather than a spring bias arrangement as shown in the preferred embodiment.

I claim:

1. In combination with a valve, a valve control unit comprising:
   A. A housing having a chamber therein, said housing having an inlet means for directing a pneumatic signal to said chamber;
   B. A diaphragm and a floating diaphragm head positioned adjacent thereto operably secured for movement within the chamber;
   C. A nonrotating adapter means connected to the diaphragm head for movement therewith, said adapter means having a helically spiraled grooved recess therein;
   D. A shaft, one end of said shaft having a perimetrical helically spiraled thread, said end positioned within and mated with the grooved recess in the adapter means, the other end of said shaft connected to a valve means so that a forward stroke of the adapter means rotates the shaft and operates the valve means;
   E. At least two rods connected to the diaphragm head and extending through the housing and a collar connected to and extending externally about the housing, said rods moving with the diaphragm head and contacting said collar to stop the forward stroke of said diaphragm head; and
   F. Returning means positioned to operate within the housing for a return stroke of the diaphragm to a starting position.

2. The valve control unit of claim 1 wherein the end of each rod extending through the housing is threadably terminated and an adjusting stop nut is threaded thereon, said adjusting nut contacting said collar to stop the forward stroke of the diaphragm head.

3. The valve control unit of claim 1 wherein an adjustable nut is threaded on each rod between its end and outside of the housing to contact said housing to limit the return stroke of the diaphragm head.

4. In combination with a valve, a valve control unit comprising:
   A. An annular housing having a chamber therein;
   B. A diaphragm operably secured for movement within the chamber;
   C. Pneumatic signal inlet means extending through said housing into the chamber to activate said diaphragm;
   D. A floating diaphragm head positioned adjacent said diaphragm;
   E. A nonrotating adapter connected to said diaphragm head, said adapter having a helically spiraled grooved recess in an end thereof;
   F. A shaft, one end of said shaft having a perimetrical helically spiraled thread, said end positioned within and mated with the grooved recess in the adapter, the other end of said shaft connected to a valve so that a forward stroke of the adapter rotates the shaft and operates the valve;
   G. A helical spring positioned within the chamber about said shaft and abutting said diaphragm head and an adjustable spring-tensioning means in the bottom of said chamber to cause said diaphragm head to be spring biased;
   H. At least two rods connected to the diaphragm head and extending out of said housing, each having an adjusting stop nut mounted on one end; and
   I. An annular collar positioned about said housing whereby actuation by a pneumatic signal forces said diaphragm downward, said downward movement terminated when said adjusting stop nuts contact said collar.